(12) United States Patent
Carr

(10) Patent No.: US 6,941,428 B2
(45) Date of Patent: Sep. 6, 2005

(54) MEMORY CONTROLLER OPTIMIZATION

(75) Inventor: Jeffery D. Carr, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 10/254,263

(22) Filed: Sep. 25, 2002

(65) Prior Publication Data

US 2004/0059881 A1 Mar. 25, 2004

(51) Int. Cl.[7] ............................................. G06F 12/00
(52) U.S. Cl. ..................................... 711/158; 710/244
(58) Field of Search ........................... 710/244, 28, 63, 710/308; 711/104, 137, 134, 158, 216

(56) References Cited

U.S. PATENT DOCUMENTS

| | | | |
|---|---|---|---|
| 4,096,571 A | * | 6/1978 | Vander Mey ............... 711/151 |
| 4,665,481 A | | 5/1987 | Stonier et al. |
| 4,764,865 A | | 8/1988 | Temple, III |
| 4,791,552 A | | 12/1988 | Natusch et al. |
| 5,265,212 A | | 11/1993 | Bruce, II |
| 5,426,765 A | * | 6/1995 | Stevens et al. ............. 711/131 |
| 5,438,666 A | * | 8/1995 | Craft et al. .................... 710/22 |
| 5,506,969 A | * | 4/1996 | Wall et al. ................... 710/107 |
| 5,649,157 A | | 7/1997 | Williams |
| 5,881,256 A | | 3/1999 | Lee |
| 5,898,854 A | * | 4/1999 | Abramson et al. ........... 712/218 |
| 5,920,898 A | | 7/1999 | Bolyn et al. |
| 5,950,219 A | * | 9/1999 | Rao ............................... 711/5 |
| 6,006,303 A | * | 12/1999 | Barnaby et al. ............. 710/244 |
| 6,061,759 A | | 5/2000 | Guo |
| 6,064,624 A | | 5/2000 | Pawlowski |
| 6,104,724 A | * | 8/2000 | Upp ............................ 370/458 |
| 6,145,052 A | * | 11/2000 | Howe et al. ................. 711/112 |
| 6,182,197 B1 | * | 1/2001 | Dias et al. ................... 711/151 |
| 6,192,461 B1 | | 2/2001 | Williamson et al. |
| 6,215,724 B1 | | 4/2001 | Pawlowski |

FOREIGN PATENT DOCUMENTS

| | | |
|---|---|---|
| JP | 9330289 A | 12/1997 |
| WO | WO 00/26773 | 5/2000 |

* cited by examiner

Primary Examiner—Nasser Moazzami
(74) Attorney, Agent, or Firm—William H. Steinberg; Hoffman, Warnick & D'Alessandro LLC

(57) ABSTRACT

A memory controller, method and program product for memory controller optimization by active re-prioritization of requests based on memory bus activity. The invention continually monitors memory bus activity and, where necessary, re-prioritizes a queue of pending memory requests. In addition, mechanisms are provided to abort an existing request on a memory bus, and interrupt an existing request to complete a pending request.

16 Claims, 2 Drawing Sheets

MEMORY CONTROLLER OPTIMIZATION

BACKGROUND OF THE INVENTION

1. Technical Field

The present invention relates generally to memory transfers and, more particularly, to memory controller optimization and a related method and program product for optimizing a memory controller.

2. Related Art

During arbitration on a memory bus, there is a significant amount of cycles that an internal memory controller spends waiting on an acknowledgement for an existing request from the memory bus. This lag time creates a number of disadvantageous situations. First, during the lag time, resources are underutilized because the memory bus and/or a corresponding memory controller are idle. Second, where a queue of pending memory requests is kept for the memory controller, higher priority pending requests may be forced to wait for completion of a lower priority existing request on the memory bus. In other situations, a pending request may have a higher priority than another pending request, but may not be positioned correctly in the queue. Current technology is known to adjust memory request priorities, i.e., re-arrange the queue, based on some selectable setting from an outside control. Unfortunately, any re-arrangement that does not actively re-prioritize pending requests based on bus activity is incapable of fully optimizing memory controller usage. In addition, current technology does not take advantage of efficiency that can be gained by aborting an existing request or interrupting an existing request to complete a pending request.

In view of the foregoing, there is a need in the art for a memory controller optimization by active re-prioritizing of pending requests based on memory bus activity and, where appropriate, aborting or interrupting an existing request.

SUMMARY OF THE INVENTION

The invention provides a memory controller, method and program product exhibiting active optimization by providing re-prioritization of requests based on memory bus activity. The invention continually monitors memory bus activity and, where necessary, re-prioritizes pending requests. In addition, mechanisms are provided to abort or interrupt an existing request on a memory bus.

A first aspect of the invention is directed to a method of actively optimizing an internal memory controller of a chip, the internal memory controller having a plurality of pending requests for a memory bus from a plurality of requestors, the method comprising the steps of: monitoring memory bus activity; re-prioritizing pending memory requests based on memory bus activity; and repeating the above steps.

A second aspect of the invention is directed to a memory controller for managing a plurality of pending memory requests for a memory bus, the controller comprising: a memory bus monitoring system; and a re-prioritizing system that actively re-prioritizes pending memory requests based on memory bus activity.

A third aspect of the invention is directed to a computer program product comprising a computer useable medium having computer readable program code embodied therein for optimizing a memory controller that manages a plurality of pending memory requests for a memory bus, the program product comprising: program code configured to monitor memory bus activity; and program code configured to actively re-prioritize pending memory requests based on memory bus activity.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
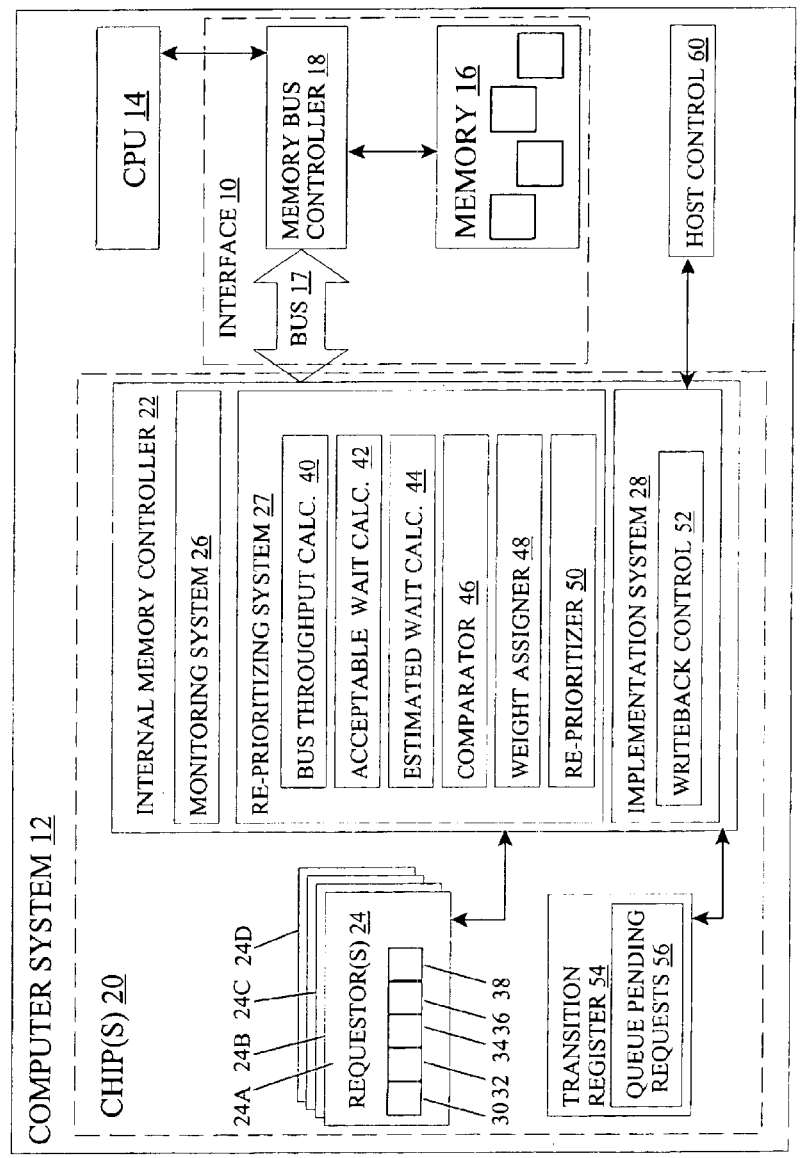
FIG. 1 shows a block diagram of computer system including a memory interface between a chip, a memory bus and a memory.

With reference to the accompanying drawings, FIG. 1 is a block diagram of a memory interface 10 within a computer system 12. Computer system 12 includes, inter alia, a central processing unit (CPU) 14, a memory 16, an architected memory bus 17, a memory bus controller 18, and at least one chip 20 that provides various functionality of the system. Each chip 20 includes an internal memory controller 22 that is accessed by a plurality of internal chiplets 24. Chiplets 24 shall be referred to herein as "requesters" since, in the context of the invention, they issue memory requests to internal memory controller 22 to access memory bus 17. Each chip 20 also includes a transition register 54 for storing a prioritized queue of pending requests 56. Memory bus 17 communicates with memory bus controller 18 to access, inter alia, memory 16 to read or write data via memory bus controller 18.

Additional components such as cache memory, communication systems, system software, etc., may be provided as part of computer system 12. Memory 16 may comprise any known type of data storage system and/or transmission media, including magnetic media, optical media, random access memory (RAM), read only memory (ROM), a data object, etc. Moreover, memory 16 may reside at a single physical location comprising one or more types of data storage, or be distributed across a plurality of physical systems. CPU 14 may likewise comprise a single processing unit, or a plurality of processing units distributed across one or more locations. Although one chip 20 is shown, it should be recognized that any number of chips 20 may access memory bus 17.

As shown in FIG. 1, each requestor 24 includes a number of registers for storing, inter alia, an identification 30, a predetermined evaluation time period 32, a predetermined requestor minimum throughput 34, a requester priority 36, and an efficiency 38.

Figure 2:
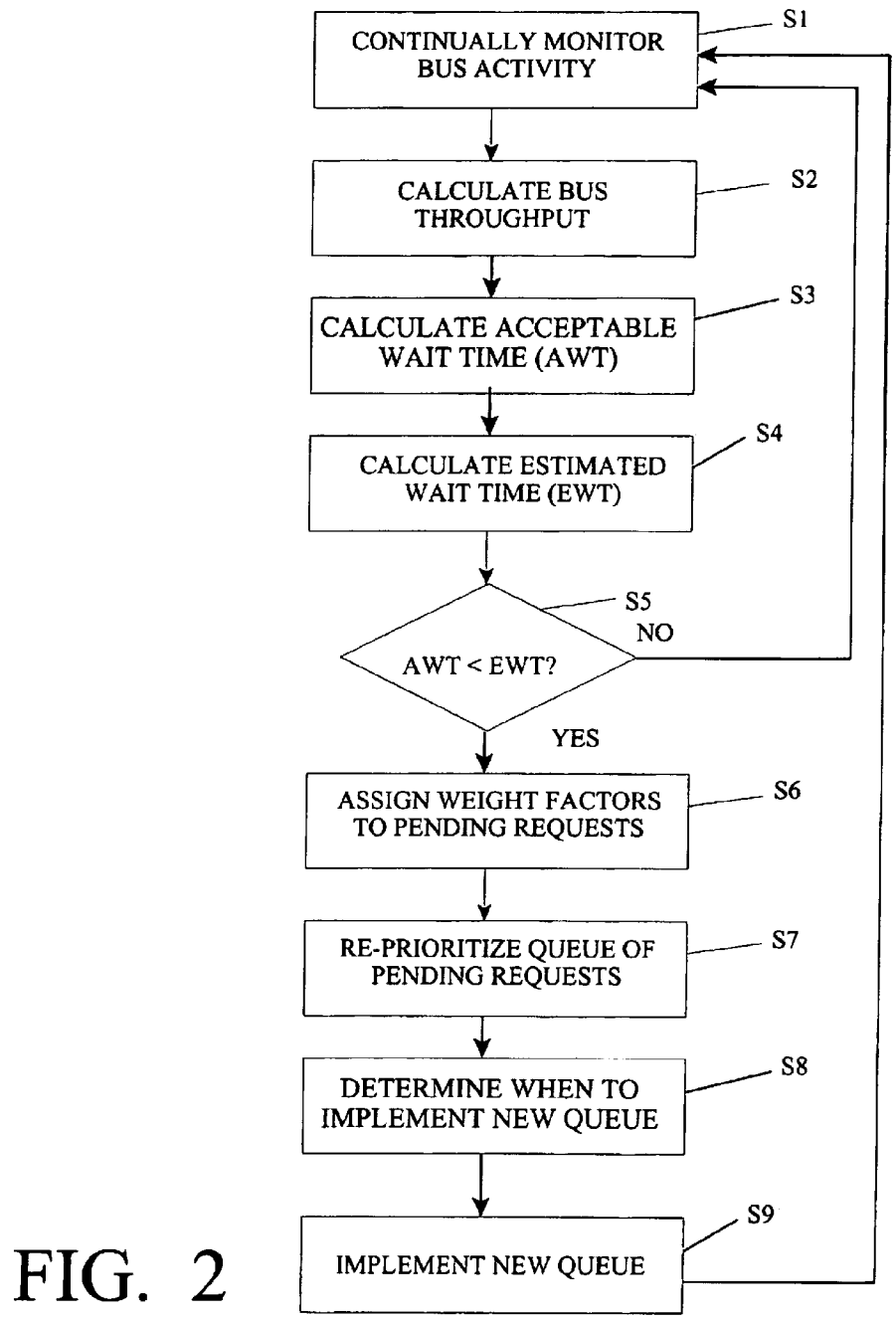
FIG. 2 shows a flow diagram of processing for optimizing a memory controller.

Internal memory controller 22, for purposes of description, can have its functionality that is relative to the invention compartmentalized as shown in FIG. 2. In particular, controller 22 can be stated as including a memory bus monitoring system 26 and a re-prioritizing system 27 that actively re-prioritizes pending memory requests based on memory bus activity. An implementation system 28 may also be provided to determine when and how the re-prioritized queue of pending requests 56 is implemented. Re-prioritizing system 27 may have its functionality compartmentalized to include: a memory bus throughput calculator 40; a requestor acceptable wait time calculator 42; an estimated wait time calculator 44; a comparator 46; a weight assigner 48; and a re-prioritizer 50. Implementation system 28 may include a writeback control 52. It should be recognized that memory controller 22 includes a variety of other functionality relative to transfers that are not shown but considered inherent in its makeup.

Turning to FIG. 2, operation of the above functions will be described. It should be recognized that while all of the steps of operation will be described, not all of the steps constitute the inventive nature of memory controller 22 as delineated in the attached claims. In addition, the order of steps shown can be altered in some instances if desired.

In a first step S1, memory bus 17 activity is continually monitored by monitoring system 26 of internal memory controller 22. This step includes monitoring a busy status of memory bus 17, but also may include collecting memory bus performance factors such as a variety of transfer types, transfer rate(s) and duration, and lag time(s) in transfer. Lag time(s) may be determined between any two of a respective transfer's request, acknowledgment and completion.

In steps S2–S7, the memory bus performance parameters are used by re-prioritizing system 27 to actively re-prioritize pending memory requests based on memory bus 17 activity. In step S2, the memory bus performance parameters may be used to calculate a memory bus throughput using memory bus throughput calculator 40 (FIG. 1). The memory bus throughput may be stated in some measure of data, e.g., bytes, per unit time, and is a function of the transfer rate(s) for a particular type of transfer (based on bus width and time) and the lag time(s) between parts of the transfer, e.g., request and acknowledgment, request and transfer completion, etc. The memory bus throughput is also a function of an evaluation time period 32 (FIG. 1), i.e., a window or duration of time during which a requestor wants to evaluate memory bus activity. For example, memory bus throughput for a particular bus (width) may be evaluated over a 10 ns window during which transfer occurs at 1 bit/ns for 3 ns, stops for 2 ns, continues at 2 bits/ns for 3 ns, and then stops again for the remaining 2 ns, resulting in a throughput of 0.9 bits/ns (9 bits/10 ns). Accordingly, each requestor 24 may initiate a customized evaluation of memory bus throughput based on its respective evaluation time period.

In step S3, an acceptable wait time for a requestor 24 is calculated by acceptable wait time calculator 42 (FIG. 1). The "acceptable wait time," hereinafter AWT, is a customizable amount of time that a requestor is willing to wait for access to memory bus 17. The AWT may be calculated in a number of ways or simply set by a register. One calculation embodiment is based on a respective requestor's evaluation time period 32 (FIG. 1), a requestor minimum throughput 34 (FIG. 1), an efficiency 38 (FIG. 1) and a width of bus 17. The "requestor minimum throughput" 34 is a minimum throughput of memory bus 17 that the requestor will accept. The efficiency is a user defined percentage to be applied to requestor minimum throughput 34. In this embodiment, AWT=[efficiency×requestor minimum throughput]/bit count, where bit count is the number of cycles counted during evaluation time period 32 times the bus width, e.g., 5 cycles at 32 bits is 160 bits.

In step S4, an estimated wait time for subsequent memory request completion is calculated by estimated wait calculator 44. In one embodiment, the "estimated wait time," hereinafter EWT, is based on the memory bus throughput (from step S2) and requestor evaluation time period 32. That is, the memory bus throughput divided by requestor evaluation time period 32. The EWT represents the amount of time that is expected to be required for memory bus 17 to complete a pending request during the evaluation time period, and will vary depending the workload of memory bus 17. In other words, the EWT is the amount of time that, on average, controller 22 will have to wait to complete a transfer and, therefore, the amount of time available for memory controller 22 to complete other work such as re-prioritization.

Relative to steps S2–S4, although only one evaluation time period 32 has been described per requester, it should be recognized that different evaluation time periods can be establish for different calculations. For example, an evaluation time period for each of the AWT and the EWT calculations. In addition, although particular embodiments have been described for calculating the AWT, EWT and memory bus throughput, it should be recognized that a variety of different factors and mathematical formulae can be implemented according to user preferences.

In step S5, comparator 46 compares the AWT to the EWT for each requestor's request. If the AWT is less than the EWT, then an 'assign weight' enable signal is sent to weight assigner 48 for that requestor's request. When the AWT is more than the EWT, it signifies that the respective requestor accepts the estimated wait time for access to memory bus 17, and no active re-evaluation of the request's prioritization is completed. However, the request's priority may be changed by re-prioritization of other pending requests, as explained below.

In step S6, pending requests that generate an 'assign weight' enable signal are assigned new weighting factors by weight assigner 48. So every pending memory request has a weighting factor, new requests are assigned a weighting factor, as described below, by weight assigner 48 when initially received by internal memory controller 22. Assigning weights may include implementing a hashing algorithm that assigns weighting factors to pending requests. One technique of calculating the weighting factors is to base them on a requestor's respective identification 30 (FIG. 1), EWT and AWT. In particular, each pending request may be assigned a weighting factor determined by dividing a respective EWT by a respective AWT, i.e., EWT/AWT. The weighting factor may also include some representation of the requestor's identification 30 (FIG. 1) so a request from a more important requestor can be handled earlier. For comparison with the queue of pending requests 54, an existing request on memory bus 17 may also have a weighting factor calculated as described above. It should be recognized that the weighting factors can be calculated in a number of ways, and that the embodiment described is just one method of calculation.

In step S7, the queue of pending memory requests 56 stored in a priority transition register 54 is re-prioritized by re-prioritizer 50 based on the revised pending requests' weighting factors. The new queue 56 is then stored in priority transition register 54.

The task of implementing the new queue, steps S8–S9, is a function of implementation system 28. In step S8, writeback control 52 determines when the new queue of pending requests 56 will be implemented. Writeback control 52 is generated from handshake controls on memory controller 22 that interface with requestor(s) 24. A variety of factors may be taken into consideration in making the determination of when to implement the new queue 56. For instance, if an existing request's transfer is occurring that is of a higher priority than any pending request, writeback control 52 may wait to implement the new queue if the implementation would slow the transfer. In another example, writeback control 52 may wait for current pending requests to be started before implementing the new queue. Any of a variety of predetermined scenarios can be implemented via writeback control 52. For further control of when the new queue 56 is implemented, a host control 60 is provided that allows for overriding of writeback control 52 by other parts of computer system 12. For example, host control 60 may override writeback control 52 when known types of transfers will occur and calculations are not necessary, or some system component wants manual control of transfers.

In step S9, how the new queue 56 is implemented is determined by writeback control 52. Implementation may take a variety of forms. For purposes of discussion, four requestors 24A, 24B, 24C and 24D may be present with corresponding requests A, B, C, D and respective priorities of 1, 2, 3 and 4, with 1 being the highest. In a first instance, implementation includes an overwrite of the priority registers 36 (FIG. 1) of the requesters 24A–24D with no immediate change in transfer activity. That is, the priorities of the pending memory requests from queue 56 are implemented in respective requestor priority registers 36 so that the order in which internal memory controller 22 works on the requests is altered. For example, the priority of requestor 24D's request may have been raised such that the priority order is changed from A, B, C, D to D, A, B, C.

In a second instance, writeback control 52 may also implement an abort of a requestor's existing request on memory bus 17 and complete another pending request. This situation may occur where an existing request's, e.g, D, priority is low and a new pending request's, e.g., A, priority is very high, thus necessitating aborting of the existing request.

In a third instance, writeback control 52 may also implement an interruption of an existing request, complete another pending request, and then proceed with the original existing request. This situation may arise, for example, where memory controller 22 is idle while awaiting an acknowledgment from memory bus 17 for an existing request, e.g., C, and the EWT for a pending request, e.g., A, indicates that the pending request can be completed before the existing request (C). In this case, memory controller 22 is instructed to interrupt (i.e., place on hold) the existing request (C), complete the pending request (A) and then continue with the existing request (C). Of course, the completion of the pending request is predicated on not violating the existing requestor's 24C AWT.

Following step S9, the process outlined above repeats, i.e., continues with monitoring of bus activity at step S1.

The above-described invention provides more efficiency within chip 20 and gives the best opportunity to utilize internal memory controller 22 efficiently. By continually monitoring memory bus 17 activity, the invention provides increased flexibility relative to internal memory bus controller 22 workload compared to static priorities.

In the previous discussion, it will be understood that the method steps discussed are performed by hardware contained within chip 20 and by a set of registers and control hardware within internal memory controller 22 and/or requestor(s) 24. However, it is understood that the various devices, modules, mechanisms and systems described herein may be realized in hardware or software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of actively optimizing an internal memory controller of a chip, the internal memory controller having a plurality of pending requests for a memory bus from a plurality of requestors, the method comprising the steps of:
    monitoring memory bus activity;
    re-prioritizing pending memory requests based on memory bus activity and an acceptable wait time for a requestor; and
    repeating the above steps,
    wherein the step of monitoring includes collecting memory bus performance factors,
    and wherein each requestor includes an evaluation time period register, a requestor minimum throughput register and an efficiency register, and each pending request includes a weight factor, wherein the step of re-prioritizing includes:
    determining a throughput of the memory bus;
    determining an estimated wait time that a requestor will have to wait to gain access to the bus;
    calculating an acceptable wait time for a requestor based on the respective requestor evaluation time period, the requestor minimum throughput, the efficiency and a bus width;
    assigning a new weight factor to each pending request having an acceptable wait time that is less than an estimated wait time; and
    re-prioritizing a prioritized queue of pending requests.

2. The method of claim 1, further comprising the step of aborting an existing request on the memory bus and completing a pending request.

3. The method of claim 1, further comprising the step of interrupting an existing request on the memory bus, completing a pending request and continuing with the existing request.

4. The method of claim 1, wherein the step of re-prioritizing includes implementing a hashing algorithm.

5. The method of claim 1, wherein the memory bus throughput is based on at least one transfer rate for a particular type of transfer, any lag time between parts of the transfer and the evaluation time period.

6. A memory controller for managing a plurality of pending memory requests for a memory bus, the controller comprising:

a memory bus monitoring system; and a re-prioritizing system that actively re-prioritizes pending memory requests based on memory bus activity and an acceptable wait time for a requestor, wherein the re-prioritizing system includes:
a memory bus throughput calculator;
a requestor acceptable wait time calculator;
an estimated wait time calculator;
a comparator for comparing the acceptable wait time to the estimated wait time;
a weight assigner that, in the case that the anticipated wait time is less than the estimated wait time, assigns a weight factor to a pending memory request; and
a re-prioritizer for re-prioritizing a prioritized queue of pending memory requests based on the weight factors.

7. The memory controller of claim 6, further comprising an implementation system including a writeback control that determines when to implement the prioritized queue of pending memory requests.

8. The memory controller of claim 7, further comprising an implementation system including a writeback control that implements the prioritized queue of pending memory requests by changing a priority register of at least one requestor of a respective pending memory request.

9. The memory controller of claim 8, wherein the writeback control implements the prioritized queue of pending memory requests by also conducting at least one of:

aborting an existing request on the memory bus and completing a pending request; and interrupting an existing request on the memory bus, completing a pending request and continuing with the existing request.

10. The memory controller of claim 6, further comprising a priority transition register for storing the prioritized queue of pending memory requests.

11. The memory controller of claim 6, wherein the memory bus throughput calculator determines a memory bus throughput based on at least one transfer rate for a particular type of transfer, any lag time between parts of the transfer and an evaluation time period.

12. The memory controller of claim 6, wherein the acceptable wait time calculator calculates the acceptable wait time for a requestor based on a predetermined requestor evaluation time period, a predetermined requestor minimum throughput, an efficiency and a bus width.

13. The memory controller of claim 6, wherein the estimated wait time calculator calculates the estimated wait time for a requestor based on a requestor evaluation time period and the memory bus throughput.

14. The memory controller of claim 6, wherein the re-prioritizer implements a hashing algorithm.

15. A computer program product comprising a computer useable medium having computer readable program code embodied therein for optimizing a memory controller that manages a plurality of pending memory requests for a memory bus, the program product comprising:

program code configured to monitor memory bus activity; and program code configured to actively re-prioritize pending memory requests based on memory bus activity and an acceptable wait time for a requestor, wherein the program code configured to re-prioritize includes:

program code configured to complete at least one of:
determine a throughput of the memory bus;
determine an estimated wait time that a requestor will have to wait to gain access to the bus;
calculate an acceptable wait time for a requestor based on the respective requestor evaluation time period, the requestor minimum throughout, the efficiency and a bus width;
assign a weight factor to each pending request having an acceptable wait time that is less than an estimated wait time; and
re-prioritize a prioritized queue of pending memory requests based on the weight factors.

16. The program product of claim 15, further comprising program code configured to implement the prioritized queue of pending memory requests by changing a priority register of at least one requestor of a respective pending request.

* * * * *